United States Patent [19] [11] 4,074,702
Lewis [45] Feb. 21, 1978

[54] CONTROL VALVE FOR BLEEDING FLUID ACTUATOR

[75] Inventor: Irwin M. Lewis, New Rochelle, N.Y.

[73] Assignee: ACF Industries, Incorporated, New York, N.Y.

[21] Appl. No.: 752,056

[22] Filed: Dec. 20, 1976

[51] Int. Cl.² .............................................. F16K 31/00
[52] U.S. Cl. .......................... 137/625.66; 137/625.67; 251/DIG. 1; 251/324
[58] Field of Search ........................ 137/624.27, 625.66, 137/625.67; 251/DIG. 1, 324, 344

[56] References Cited

U.S. PATENT DOCUMENTS

| 2,524,142 | 10/1950 | Seeloff | 251/324 |
| 2,556,308 | 6/1951 | Weatherhead | 251/DIG. 1 |
| 2,621,885 | 12/1952 | Schmitt | 251/DIG. 1 |
| 3,902,663 | 9/1975 | Elmer | 251/324 X |
| 3,943,974 | 3/1976 | Connelly | 251/89 |

Primary Examiner—Harold W. Weakley
Attorney, Agent, or Firm—Eugene N. Riddle

[57] ABSTRACT

A control valve for bleeding fluid from a valve actuator has a slide valve with a piston on one end thereof mounted for movement within a uniform diameter piston chamber. The piston is movable longitudinally within the piston chamber between a seated position at an outer end of the piston chamber and an unseated set position adjacent the opposite inner end of the chamber. An O-ring is positioned in an annular groove in the inner wall defining the piston chamber adjacent the inner end of the piston chamber and contacts the outer periphery of the piston in fluid-tight sealing relation when the piston is in a raised unseated position adjacent the inner end of the piston chamber. The outer periphery of the piston is spaced from the adjacent inner wall of the piston chamber to permit fluid to pass between the piston and the wall when the piston is out of contact with the O-ring.

2 Claims, 5 Drawing Figures

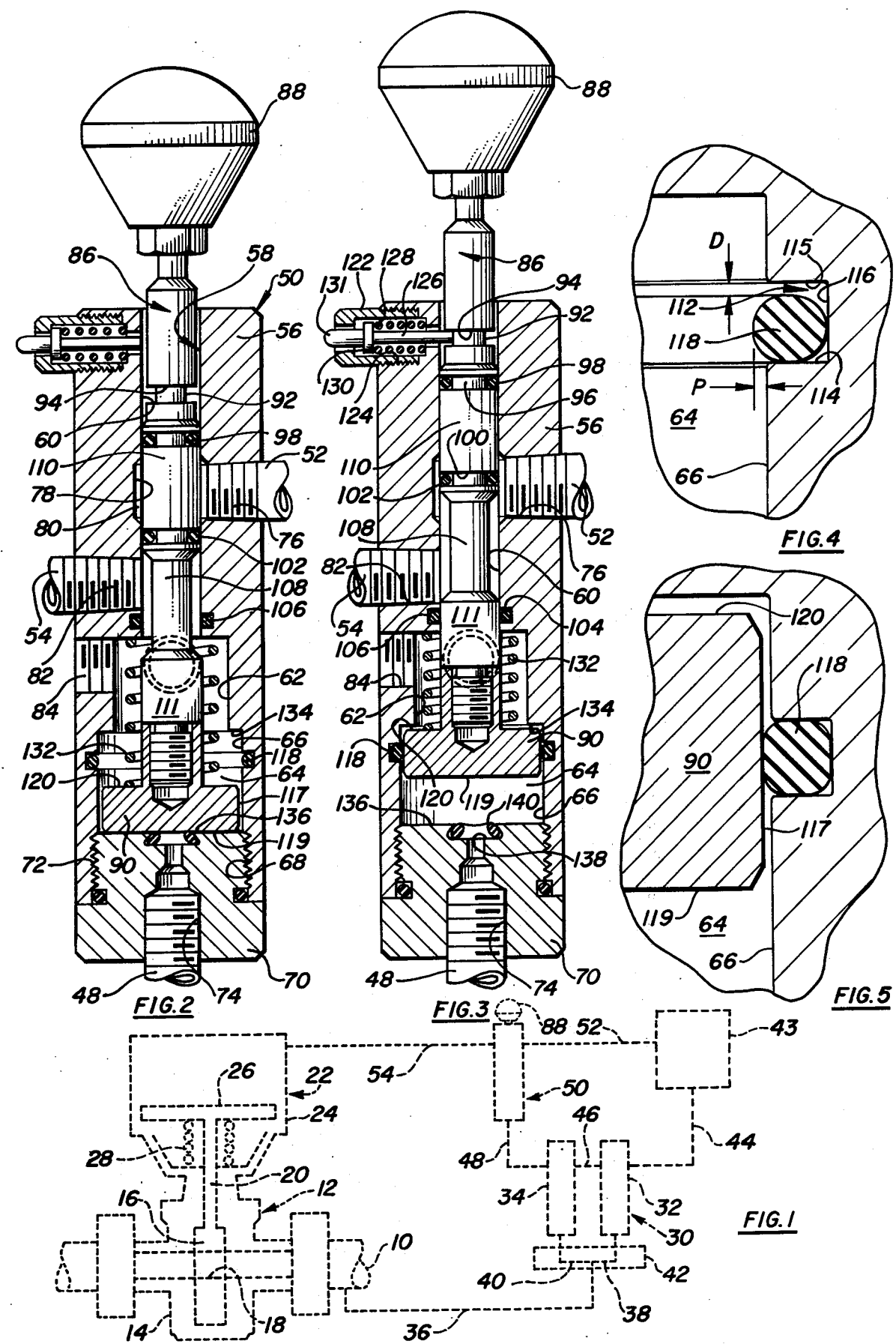

4,074,702

CONTROL VALVE FOR BLEEDING FLUID ACTUATOR

BACKGROUND OF THE INVENTION

Heretofore, as shown in U.S. Pat. No. 3,943,974 dated Mar. 16, 1976, entitled "Control Valve for Fluid Actuator" and U.S. Pat. No. 3,963,050 dated June 15, 1976, entitled "Pneumatic Relay", control valves have been provided for bleeding fluid from a valve actuator to permit a controlled valve to move to a closed position across the main flowline. Such prior control valves have included a slide valve having a piston on one end thereof mounted within a piston chamber for longitudinal movement between a seated position adjacent an outer end of the piston chamber in which fluid is exhausted from the actuator, and a raised unseated position adjacent the inner end of the piston chamber to permit fluid to be supplied to the actuator for moving and holding the controlled valve to an open position across the main flowline.

In the down or seated position in such prior art arrangements, the outer face of the piston is exposed to fluid pressure from a port leading to the outer end of the piston chamber and a bleed vent communicates with the inner end of the piston chamber adjacent the inner face of the piston. However, the piston chamber shown in such control valves heretofore has been of a dual diameter with a small diameter section forming the inner end of the piston chamber and a large diameter section forming the outer end of the piston chamber. The piston in seated position has been spaced from the inner wall defining the large diameter section of the piston chamber to permit fluid from the port to by-pass the piston and be vented to atmosphere through the bleed vent. By this arrangement, any fluid pressure leaking into the piston chamber from the port in the seated position of the piston results in fluid pressure being vented around the piston to allow the piston to remain in its seated position. The piston is positioned within the small diameter section of the piston chamber in its raised unseated position and is in fluid-tight sealing engagement with the inner wall defining the small diameter section.

BRIEF DESCRIPTION OF THE PRESENT INVENTION

The present invention is directed to a control valve for bleeding fluid from a valve actuator in which a slide valve has a piston on one end thereof mounted within a single uniform diameter valve chamber. The valve chamber has and is defined by a circumferential wall which is spaced from the outer periphery of the piston so that fluid may pass or leak between the wall defining the valve chamber and the piston thereby to permit fluid to bypass the piston in a seated position of the piston. The circumferential wall defining the piston chamber has a continuous single diameter and an annular groove therein is positioned generally adjacent the inner end of the piston chamber. An O-ring is positioned in the annular groove and projects slightly into the piston chamber to contact the outer periphery of the piston in fluid-tight sealing relation when the piston is in the raised unseated position thereby to prevent fluid from by-passing the piston. In the seated position of the piston, fluid is permitted to by-pass the piston and to be vented to atmosphere to prevent any inadvertent movement of the piston to a raised position in which position fluid is supplied to the actuator. In the raised position of the piston, fluid is prevented from by-passing the piston to permit supply fluid to the actuator for moving the controlled valve to an open position with respect to the main flowline.

Thus, by the present arrangement, a control valve for a valve actuator is provided having a single diameter piston chamber receiving the piston and permitting the fluid to by-pass the piston when the piston is in a seated position while preventing the by-passing of fluid when the piston is in a raised up position.

DESCRIPTION OF DRAWINGS

FIG. 1 is a schematic view showing the system in which the control valve of the present invention is employed with a fluid actuator and a gate valve across a main flowline;

FIG. 2 is a sectional view of the control valve shown in FIG. 1 and comprising the present invention with the piston being shown in its down seated position;

FIG. 3 is a sectional view similar to FIG. 2 but showing the piston in its raised operative unseated position;

FIG. 4 is an enlarged segment of FIG. 2 showing the O-ring positioned in a groove of the circumferential wall forming the piston chamber and out of engagement with the piston; and FIG. 5 is an enlarged segment of FIG. 3 showing the O-ring positioned in the annular groove in the circumferential wall defining the piston chamber and in engagement with the piston to form a fluid-tight sealing relation therewith.

Referring now to the drawing for a better understanding of this invention, and more particularly to FIG. 1, a main flowline indicated at 10 has a gate valve structure generally indicated at 12 therein. Gate valve body 14 has a slab gate 16 mounted therein with an opening 18 in slab gate 16 movable between open and closed positions relative to flowline 10. A stem indicated at 20 is connected to slab gate 16 and extends upwardly through a pneumatic actuator indicated generally at 22. Pneumatic actuator 22 includes a cylinder 24 having a piston 26 mounted therein and secured to stem 20 for reciprocal movement within cylinder 24. A spring 28 mounted within cylinder 24 continuously urges piston 26 and gate valve member 16 to a closed position.

A high-low pilot structure is generally indicated at 30 and includes a high pressure pilot 32 and a low pressure pilot 34. Pressure in flowline 10 is sensed through pilot line 36 and through branch line 38 to high pressure pilot 32 said branch line 40 to low pressure pilot 34. Pilots 32 and 34 are supported on a base 42. Each pilot 32, 34 has a shiftable valve member therein and a spring urging the valve member in one direction. A fluid source 43, such as a pressurized cylinder of oxygen or nitrogen gas, is connected by line 44 to high pressure pilot 32, thence by a connecting line 46 to low pressure pilot 34 and by line 48 to the control valve structure 50. High pressure pilot 32 may be set to be actuated at a predetermined high pressure in flowline 10 and low pressure pilot 34 may be set to be actuated at a predetermined low pressure in flowline 10. Thus, an operating fluid pressure range is provided between the low pressure at which low pressure pilot 34 is set and the high pressure at which high pressure pilot 32 is set. In the event the fluid pressure in flowline 10 reaches a pressure lower than the pressure at which low pressure pilot 34 is set the pressurized gas within the line 46 to low pressure pilot valve 34 is interrupted and exhausted to atmosphere thereby to interrupt the fluid pressure in line 48 to control valve 50.

Likewise, when a predetermined high pressure is reached outside the operating range at which high pressure pilot 32 is set, fluid in line 44 supplied to high pressure valve 32 is exhausted to atmosphere thereby to interrupt the fluid pressure in line 48 to fluid control valve 50. For further details of the operation of pilot valve structure 30, reference is made to the prior U.S. Pat. No. 3,043,331 issued July 10, 1962 the entire disclosure of which is incorporated by this reference.

Fluid, preferably pressurized gas, is supplied from source 43 through line 52 to control valve 50 and thence through line 54 to actuator 22. The pressurized gas is supplied continuously to actuator 22 as long as lines 52 and 54 are in fluid communication with each other through control valve 50 and piston 26 remains in the position shown in FIG. 1 in which slab gate 16 is in an open position. When the flow of fluid is interrupted by control valve 50 to line 54, the fluid is exhausted from line 54 through control valve 50 as will be explained in detail later, piston 26 will move to its up position under the bias of spring 28 and slab gate 16 will move to a closed position relative to flowline 10 thereby to shut off fluid flow through flowline 10.

Referring now more particularly to FIGS. 2–4 in which control valve 50 comprising the present invention is shown in detail, a housing 56 forming the main body is provided and has a longitudinal bore generally indicated at 58 including a main bore 60 of reduced diameter, an intermediate bore 62 of an intermediate diameter and an enlarged diameter portion 64 of a uniform diameter and forming a piston chamber defined by a circumferential wall 66. The lower end of housing 56 has internal screw threads 68 formed therein and an externally threaded end plug 70 has external screw threads 72 which engage internal threads 68. A central bore 74 is provided in end plug 70 and line 48 is threaded within bore 74.

Housing 56 has an inlet port 76 therein in which line 52 is threaded. Inlet port 76 communicates with main bore 60 and an enlarged diameter portion 78 adjacent port 76 provides pressured gas in chamber 80 formed thereby. An outlet port 82 is formed in housing 56 and line 54 is connected thereto to supply pressurized gas to actuator 22. A vent 84 is in fluid communication with intermediate bore portion 62 while outlet 82 is in communication with main bore 60.

A slide valve is indicated generally at 86 and has a knob 88 adjacent an outer end thereof which may be manually gripped for actuating slide valve 86 as will be explained. A piston generally indicated at 90 is secured adjacent the inner end of slide valve 86 and is mounted within enlarged bore portion 64 for movement. The main body of slide valve 86 has an annular groove 92 therein adjacent knob 88. Annular groove 92 forms an upper abutting surface 94. An annular groove 96 in slide valve 86 has an O-ring 98 mounted therein for engagement with the adjacent surface of main bore 60. Likewise, an annular groove 100 has an O-ring 102 therein for engagement with the surface defining main bore 60. An annular groove 104 in housing 56 receives an O-ring 106 therein. Slide valve 86 has a reduced diameter center section 108 positioned between two adjacent end sections 110 and 111.

Enlarged diameter bore portion 64 has an annular groove 112 therein adjacent the upper end of the piston chamber defined by opposed sides 114 and 115 connected by rear wall 116. Positioned within groove 112 is an O-ring 118 which projects a distance P slightly into the space defining the piston chamber, such as around 0.005 inch when employed with a piston chamber having an inner diameter of about 1¼ inches. For example, a minimum projection P of O-ring 118 of around 0.003 inch would probably be necessary dependent on such factors as the diameter of the piston and piston chamber. O-ring 118 fits loosely within groove 112 and when out of contact with piston 90 in the seated position thereof is spaced a distance D as shown in FIG. 4 from side 115. With groove 12 having a width of around 0.190 inch, for example, O-ring 118 has a diameter of 0.170 inch with distance D being 0.020 inch. When piston 90 moves to the up position in fluid-tight sealing relation with piston 90, O-ring 118 is in engagement with both sides 114, 115 as shown in FIG. 5. Piston 90 has an outer peripheral surface 117 which is spaced from circumferential wall 66 of the piston chamber to permit fluid to pass between piston 90 and wall 66 except when O-ring 118 is in engagement with surface 117 of piston 90. Piston 90 has an outer face 119 and an opposite inner face 120.

FIG. 3 shows slide valve 86 in an out position in which position slide valve 86 remains until the fluid pressure in line 48 builds up to a predetermined amount. To retain slide valve 86 in the position of FIG. 3 a cap 122 is threaded within an internally threaded opening 124 in housing 56. A plunger or detent 126 is mounted within cap 122 and a spring 128 engages a flange 130 on plunger 126 to urge continuously plunger 126 to a position out of engagement with annular groove 92. The inner end of plunger 126 engages abutment 94 when received within groove 92 and outer end 131 of plunger 126 extends outwardly through an opening in cap 122. Plunger 126 is depressed inwardly manually by pushing in on end 131 until the inner end of plunger 126 is received within groove 92 and held in its inner position by frictional contact with adjacent abutment 94. To hold plunger 126 in engagement with abutment 94, a spring 132 is mounted within intermediate diameter portion 62 and is biased between inner face 120 of piston 90 and an annular ledge 134 between intermediate bore 62 and enlarged diameter bore portion 64. An abutment 136 is arranged adjacent an end of enlarged diameter bore portion 64 and face 119 of piston 90 seats on abutment 136 in the closed or in position of slide valve 86 as shown in FIG. 2. It is noted that ledge 134 is spaced slightly from the adjacent inner face 120 of piston 90 in the position of FIG. 3, in which slide valve 86 is held in an out position by detent or plunger 126. This position is maintained until fluid pressure in line 48 reaches a predetermined amount at which time piston 90 is urged upwardly against the bias of spring 132 thereby to space abutment 94 slightly from detent 126 releasing detent 126 under the bias of spring 128. When plunger 126 is released, control valve 50 becomes operable and piston 90 remains in the position shown in FIG. 3, so long as the fluid pressure within line 48 acting against face 119 of piston 90 remains at a predetermined amount.

It is noted that the entire face 119 is exposed to fluid pressure from line 48 in the position of FIG. 3. In order to expose only a relatively small surface area of face 119 to fluid pressure in line 48, a tapered recess 138 is provided in abutment 136 and an O-ring 140 is positioned in recess 138. The tapered recess 138 serves to retain O-ring 140 in position and as shown in FIG. 2 when piston 90 is in a seated position on abutment 136, O-ring 140 is in engagement with face 119 of piston 90. Thus, only the area of face 119 defined within O-ring 140 is exposed to fluid pressure from line 48 in the seated position of piston 90.

In operation, from the seated position of piston 90 shown in FIG. 2 in which the flow of fluid pressure from inlet 76 to outlet 82 is blocked by O-ring 102 and end portion 110, fluid communication is provided between line 34 and port 84 by reduced diameter portion 108 to bleed gas from actuator 22 for movement of slab gate 16 to a closed position. For resetting piston 90, knob 88 is gripped and slide valve 86 is moved outwardly against the bias of spring 132 with detent 126 being manually depressed within groove 92. In the position of FIG. 3, inlet 76 is in fluid engagement with outlet 82 about the reduced diameter portion 108 of slide valve 86, and fluid communication between outlet 82 and vent 84 is blocked by O-ring 106 and enlarged end portion 111 of slide valve 86. Gas is thus supplied to cylinder 24 and actuator 22 to move piston 26 downwardly to align opening 18 with flowline 10. Slide valve 86 remains in the position of FIG. 3 until fluid pressure in line 48 reaches a predetermined high amount at which time fluid pressure acting against face 119 of piston 90 moves piston 90 slightly upwardly to permit release of detent 126 under bias of spring 128. In this position, slide valve 86 is in operable position and fluid pressure is maintained to actuator 22 to hold gate valve member 16 in an open position.

In the event high pressure pilot 32 or low pressure pilot 34 is actuated by a respective high pressure or a respective low pressure, fluid supplied to line 48 is exhausted to atmosphere and the fluid pressure is reduced to atmosphere in line 48. When this occurs, piston 90 under bias of spring 132 moves to the seated position of FIG. 2 and the pressurized gas in line 54 is exhausted to atmosphere through bleed port or vent 84 thereby to permit gate valve 16 to move to a closed position under bias of spring 28. It is noted that O-ring 118 is in fluid-tight sealing engagement with outer peripheral surface 117 of piston 90 when piston 90 is in the position of FIG. 3. Upon movement of piston 90 to seated position on abutment 136, O-ring 118 is out of engagement with piston 90 and fluid may leak between peripheral surface 117 of piston 90 and the adjacent wall 66 of the piston chamber.

It is noted that only the bias of spring 132 holds piston 90 in the seated position on abutment 136. However, only a small surface area of piston 90 in seated position is exposed to fluid pressure from line 48. In the event of vibration or an abnormally high fluid pressure being reached in line 48, piston 90 may be unseated and fluid may leak past O-ring 140. However, such fluid will by-pass or go around piston 90 into its open area adjacent inner face 120 and be bled to atmosphere through vent 84. Piston 90 is only temporarily unseated as spring 132 will reseat piston 90 upon such leakage of fluid from vent 84 around piston 90 thereby to maintain slide valve 86 in the position shown in FIG. 2.

Thus, an effective fluid by-pass is provided by the employment of a single diameter piston chamber defined by wall 66 with an O-ring 118 mounted within an annular groove 112 in wall 66 to seal the outer peripheral surface 117 of piston 90 in its up raised position. Surface 117 is spaced from wall 66 to permit fluid leakage between piston 90 and wall 66 except when piston 90 is engaged by O-ring 118.

What is claimed is:

1. A control valve structure for controlling fluid communication between a first fluid pressure source and a main valve actuator mechanism and being responsive through pilot valve means to a predetermined operating pressure range in a main flowline, said control valve structure comprising:

an elongated housing having a central bore extending longitudinally thereof;

a slide valve mounted within the bore for longitudinal movement and having a piston adjacent one end thereof mounted within an enlarged diameter portion of said bore forming a piston chamber, a first spring continuously urging the slide valve and piston to a seated position of the piston adjacent one end of the piston chamber, manual gripping means adjacent the other end of said slide valve to permit the slide valve to be gripped manually to move the piston to a raised operative position against said first spring adjacent the other opposite end of the piston chamber, said enlarged diameter portion being of a uniform continuous diameter and forming an abutment on which the piston seats under the urging of said first spring when the fluid pressure is outside the predetermined operating range;

first port means including inlet and outlet ports in said housing for communicating fluid from a pressure source through the housing to the actuator mechanism;

second port means communicating with the piston chamber adjacent an inner face of the piston and responsive through the pilot valve means to fluid pressure in the main flowline outside the predetermined operating pressure range, said second port means communicating fluid pressure to the piston for maintaining the slide valve in a position normally permitting fluid pressure to be supplied through the control valve structure to the actuator mechanism when the pressure within the flowline is within the predetermined operating pressure range;

a vent in said housing communicating with the piston chamber adjacent the inner face of said piston;

said piston having an outer periphery slightly spaced from the inner circumferential wall defining the piston chamber so that fluid from the second port means passes between the piston and the circumferential wall upon any initial unseating of the piston from seated position to permit excess fluid pressure from said second port means to be vented around said piston and through said vent, said circumferential wall having an annular groove generally adjacent said opposite end of the piston chamber, an O-ring positioned in said annular groove and projecting inwardly of the circumferential wall a distance at least around 0.003 inch to contact the outer periphery of the piston in fluid-tight sealing relation when the piston is in said raised position thereby to prevent fluid from said second port means to by-pass said piston, said annular groove having a width greater than the diameter of said O-ring for loosely mounting said O-ring;

a manual detent normally depressible inwardly to engage the slide valve and hold the slide valve in a raised position against the bias of said spring, and a second spring continuously urging the detent outwardly whereby upon the reaching of a predetermined high pressure in said second port means the slide valve is moved out of engagement with the detent and the detent is released under the bias of said second spring.

2. A control valve structure as set forth in claim 1 wherein an annular resilient seal is positioned about the second port means in the seated position of the piston and exposes only a relatively small surface area of the outer face of the piston to fluid pressure from said second port means when the piston is in seated position.

* * * * *